United States Patent

Dumbauld

[15] 3,682,411
[45] Aug. 8, 1972

[54] DRAG MECHANISM FOR FISHING REELS

[72] Inventor: Richard Dumbauld, Spirit Lake, Iowa

[73] Assignee: Berkley & Company, Inc., Spirit Lake, Iowa

[22] Filed: Jan. 5, 1970

[21] Appl. No.: 572

[52] U.S. Cl. ............................................242/84.2 R
[51] Int. Cl. ..............................................A01k 89/00
[58] Field of Search........242/84.2 R, 84.2 B, 84.2 H, 242/84.21, 84.21 A, 84.5 A, 84.51 A

[56] References Cited

UNITED STATES PATENTS

| 2,711,292 | 6/1955 | Taggart et al. | 242/84.21 |
| 2,760,357 | 8/1956 | Burns | 242/84.45 |
| 3,107,876 | 10/1963 | Ament | 242/84.21 |
| 3,284,019 | 11/1966 | Wood | 242/84.21 A |
| 3,348,788 | 10/1967 | Vinokur | 242/84.21 |

FOREIGN PATENTS OR APPLICATIONS

| 1,212,063 | 3/1960 | France | 242/84.21 |

*Primary Examiner*—Billy S. Taylor
*Attorney*—Orrin M. Haugen

[57] ABSTRACT

A quick change spool adaptor and drag mechanism for placement on the spool shaft of a conventional spinning reel. The spool adaptor includes a large rear flange and forwardly extending spool receiving arbor axially bored to be received on said spool shaft. An axial counter-bore in the arbor is designed to receive a drag modular unit having friction means adjustably preventing spool rotation until a predetermined force is applied thereto. Frictional adjustment is achieved by rotation of a knob threaded on the tip of the spool shaft, the knob being of smaller diameter than the center spool opening to permit axial removal of the spool without affecting the drag adjustment. The drag modular unit includes a flanged core element slidable on but not rotatable relative to the spool shaft and supporting a series of friction disks some keyed for rotation with the spool adaptor while at least one other disk remains rotatably fixed. The disks are squeezed together with a force dependent on the axial position of the threaded knob. The spool rotates with the arbor and is axially retained thereon by suitable friction lugs.

13 Claims, 3 Drawing Figures

INVENTOR
RICHARD DUMBAULD
BY
Orrin W. Haugen
ATTORNEY

DRAG MECHANISM FOR FISHING REELS

The present invention relates generally to a fishing reel structure, and more specifically to a brake or drag mechanism which is utilized to control the friction or drag resisting the pull of the line from a line winding spool.

In particular, the present invention relates to a drag mechanism, particularly one which employs a disc-brake mechanism having a number of relatively movable parts or components forming a number of frictional interfaces. The static coefficient of friction existing between relatively movable frictional interfaces is generally less than the dynamic coefficient of friction between these surfaces, thus providing for smooth action.

In a typical fishing reel, a drag mechanism is provided which may be adjusted to resist the pull of the line, such as is encountered during the playing of a fish, an adjustment feature of the drag being provided in order to match the strength of the line to the adjusted drag characteristic. In the past, a variety of systems have been provided for controlling the drag, some of these systems including relatively rotatable disc members which are arranged in stacked relationship to form a brake assembly. In certain of these structures, materials have been selected so as to provide a portion of the friction surfaces with a static coefficient of friction less than the dynamic coefficient of friction. This arrangement will enhance the performance of the drag mechanism by at least partially eliminating erratic action due to the maximum friction being encountered at the initiation of relative motion in the assembly.

The present invention provides a plurality of frictional interfaces, each interface including a component of polytetrafluoroethylene, and is particularly adapted for use in the adaptor structures disclosed and claimed in the co-pending application of Larry L. Lilland, et al, Ser. No. 820,859, filed May 1, 1969, now U.S. Pat. No. 3,565,362, which application is assigned to the same assignee as the present invention. The drag module portion of the present invention is arranged to be received within the core of the line winding mechanism, and hence line spools may be changed, as desired, without disassembling or disturbing the setting desired on the drag mechanism.

The improved fishing reel structure of the present invention employs a drag mechanism permitting a smooth controlled drag on the line spooling assembly upon experiencing pull on the line in excess of a certain predetermined and adjusted maximum. This rotation, in response to pull, is exceptionally smooth, consistent, and repeatable. In addition, the entire drag mechanism may be permitted to remain undisturbed whenever it is desirable to change spools of line retained on the line spooling means. Since the adaptor structure disclosed and claimed in U.S. Pat. No. 3,565,362, supra, is arranged to be universally adaptable to fit a variety of fishing reels, the self-contained drag mechanism of the present structure is, itself, substantially universally adaptable.

The components of the drag assembly including the clicker pick are arranged and retained together in "-module" form. After assembly, the assembly is seated into the reel structure and may thereafter be adjustably compressed so as to provide the desired drag setting.

It is therefore a primary object of the present invention to provide an improved multiple-disc drag mechanism employing polytetrafluoroethylene at the active interfaces, the major portion of the assembly being particularly adapted to be arranged in modular form, and upon assembly of the module, the unit may be seated into the reel structure and thereafter adjusted to a proper drag setting.

It is a further object of the present invention to provide an improved disc drag mechanism for spinning reels, the mechanism providing for smooth and consistent braking action by virtue of utilizing components with mating frictional surfaces having a static coefficient of friction which is less than the dynamic coefficient of friction.

It is yet a further object of the present invention to provide an improved disc drag mechanism particularly adapted for use in connection with cartridge spool assemblies, wherein individual spools may be removed and replaced on the mounting assembly without disturbing the condition of the drag mechanism.

Other and further objects of the present invention will become apparent to those skilled in the art upon a study of the following specification, appended claims, and accompanying drawings wherein:

Figure 1:
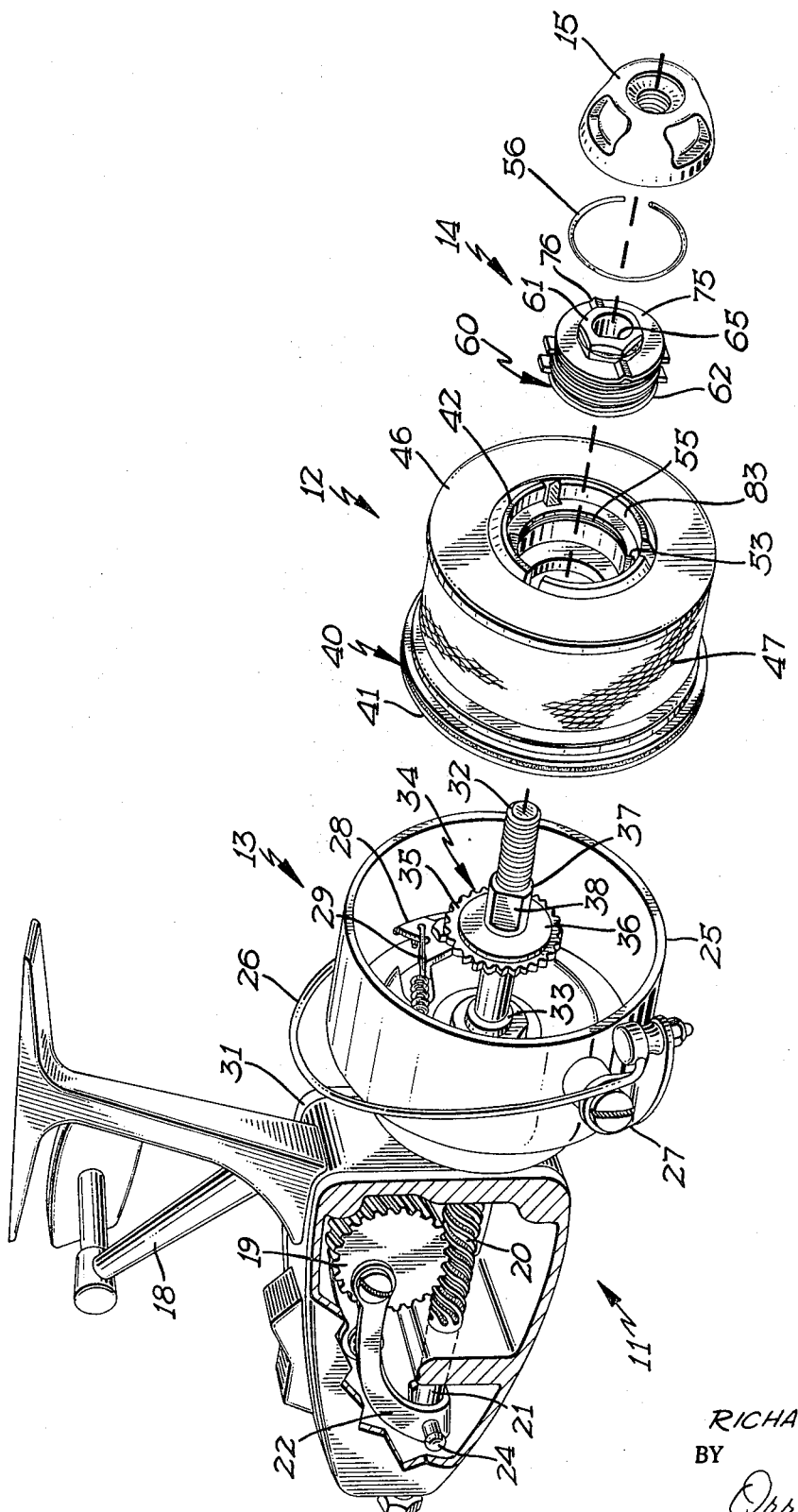
FIG. 1 is a perspective view, partially broken away, and partially exploded, showing a spinning reel assembly incorporating the improved drag of the present invention, and illustrating a portion of the drag mechanism in pre-assembled modular form.
Figure 2:
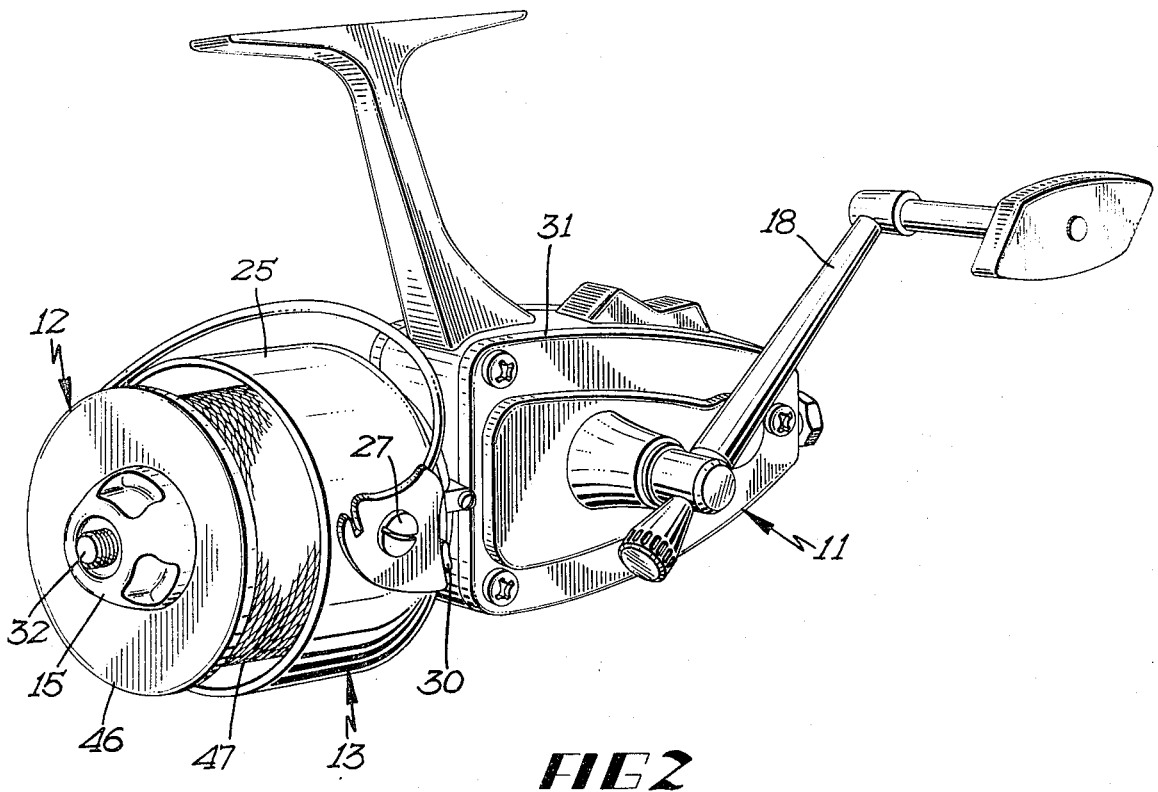
FIG. 2 is a perspective view of the structure of FIG. 1.

In accordance with the preferred modification of the present invention, and with particular attention being directed to FIG. 1 of the drawings, the spinning reel assembly shown includes a drive assembly or motion-generating segment generally designated 11, a line receiving spool means generally designated 12, a line winding means generally designated 13, and a drag module means generally designated 14. In addition, a drag adjustment knob member 15 is provided to assist in the compressed retention of the assembly in the configuration illustrated in FIG. 2.

The driving segment or motion-generating segment 11 is deemed conventional in the art, and includes a crank 18 having a driven shaft member, not shown, attached to and rotating the pinion wheel 19. Pinion wheel 19, which is provided with helical teeth, engages and drives worm 20. Worm 20, which has a hollow core along the axial extent thereof, is mounted upon and receives axially reciprocating shaft 21, reciprocating shaft 21 being driven axially by crank arm 22, arm 22 being pivotally secured to the end of shaft 21 by means of pin 24. The opposite end of arm 22 is eccentrically secured to the face of gear 19, as shown.

Worm gear 20 rotates cup-shaped hub 25, hub 25 being provided with a conventional line winding bail 26, which can be retracted, when desired, for casting operations or the like. Bail 26 is pivotally secured to hub 25 by means of the pivotal linkage shown at 27 along with a similar pivotal linkage in diametrically opposed relationship to the linkage 27. Spring-biased cam follower 28, biased radially inwardly by spring 29, is utilized to control the disposition of stop lever 30 (FIG. 2) for controlling and maintaining the line bail 26 in retracted disposition.

As is conventional, housing 31 is provided for enclosing the driving mechanism, and, of course, suitable bearings and bushing means are provided to accommodate rotation of line winding means 13 relative to housing 31 and reciprocation of shaft 21, such as is shown at 33.

Attention is now directed to shaft 21, which extends uninterruptedly through housing 31, and ultimately to its threaded tip portion as at 32. Arbor abutment means generally designated 34 is provided on shaft 21, and is preferably secured so as to be fast thereon. In its normal disposition, arbor abutment means 34 is disposed and received along shaft 21 adjacent bushing 33, the view of FIG. 1 illustrating abutment means 34 as being removed from the bushing area. Arbor abutment means 34 includes abutment face 35, and is adapted to support and receive friction washer 36. In addition, arbor abutment means 34 is provided with a sleeve segment 37 which is provided with an arcuate stop segment or flat zone 38, this portion of the apparatus being adapted to receive the hollow core of drag module means 14 in non-rotational mounted relationship therealong.

Figure 3:
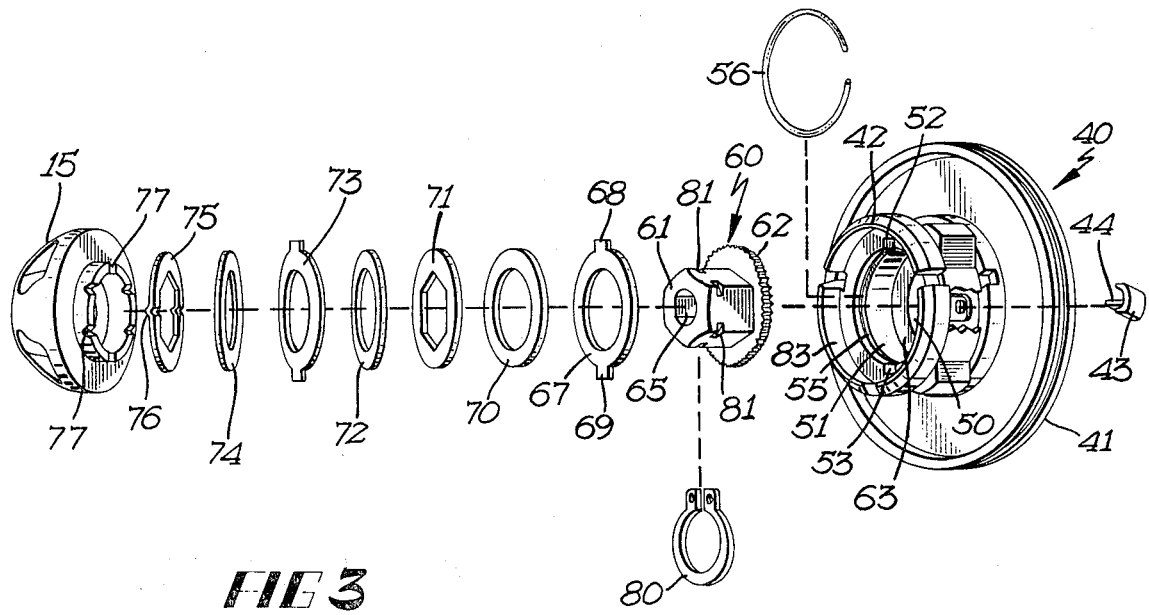
FIG. 3 is a detail perspective view in exploded disposition, and illustrating the individual components of the drag module assembly as illustrated in FIG. 1.

With attention continuing on FIG. 1, and with attention also directed to FIG. 3, the line receiving spool means generally designated 12 includes a spool adapter as shown at 40, adapter generally designated 40, including a rear flange 41 and a spool receiving arbor 42. The details of this structure are disclosed in U.S. Pat. No. 3,565,362. In addition, clicker pick 43 having a tine or blade 44 is provided, blade 44 engaging the toothed or serrated periphery of flange 62 of the drag module means and being adapted to audibly indicate relative rotation of the spool adapter assembly 40 and shaft 21. Thus, the clicker pick and drag module assembly are integral and self-contained, this feature increasing the universal application of this structure to a variety of fishing reels.

Adaptor 40 is arranged to receive spool 46 thereon, spool 46, as shown, being provided with a supply of line, such as is shown at 47. Spool 46 consists of outer flanges disposed along and at opposite ends of a central core, as more particularly described in U.S. Pat. No. 3,565,362.

Adaptor 40 has a bore formed therein as at 50, and in addition, is provided with a counter-bore as at 51. Keyways 52 and 53 are provided in oppositely disposed relationship along the counter-bore area 51, and provide locking lug means extending axially within the counter-bore, for a purpose to be made manifest hereinafter. In addition, lock ring groove 55 is provided to receive lock ring 56 therein, lock ring 56 serving to retain the drag module means 14 within the confines of counter-bore 51.

With particular attention now being directed to FIG. 3 of the drawings, the drag module means generally designated 14 includes a central core means 60 having a generally symmetrical drive shank 61, the outer periphery of which is hexagonal in configuration, and a base flange means 62 at the rear thereof. The rear surface of drag module flange 62 is adapted for frictional engagement with the forwardly disposed surface 63 which is formed at the base of counter-bore 51. This forwardly disposed frictional surface engages the rear or back surface of flange 62, and provides one of the sources of surface friction for the drag means of the present invention. The edge surface of flange 62 is preferably serrated in order to cooperatively function with clicker pick 43. Core means 60 is provided with a flat segment as at 65, which flat segment mates with flat zone 38 formed on arbor abutment means 34. A first tension disc 67 having a pair of peripheral keys 68 and 69 formed thereon, is provided for mounting along the drive shank portion 61 of core means 60, tension disc 67 preferably being fabricated from spring steel or the like and being arcuately bowed or otherwise deformed along a diameter so as to provide springing axial resistance to compression. Friction washer 70 is provided to be interposed between tension disc 67 and drag washer 71. Friction washer 70 is fabricated from molded polytetrafluoroethylene, a composition available commercially from E. I. DuPont deNemours Corp. of Wilmington, Del. under the name Teflon. The annular drag washer 71 is arranged for rotation with the central core means 61, with the internal configuration thereof being hexagonal so as to match the periphery of the drive shank 61. A second friction washer 72 is provided for interposition between annular drag washer 71 and second tension disc 73. Friction washer 72 is, of course, identical to friction washer 70, and tension disc 73 is identical to tension disc 67. A third friction washer is provided at 74, and a second drag washer 75 is shown, drag washer 75 being somewhat different from drag washer 71. The surface of drag washer 75 is provided with radially extending projections across its annular area, such as at 76, these projections cooperating with the notches 77—77, to hold the position of drag adjustment knob 15. The projections and notches feature a positive engagement, and thus no uncontrolled altering of control is obtained during use of the device. This further provides a wide degree of latitude of drag adjustment control.

With attention being re-directed to FIG. 1 of the drawings, it will be observed that the individual components of the drag module are pre-assembled in stacked relationship so as to form the drag module 14. Split lock ring 80, which is received and locked into the arcuate groove elements 81–81 (as shown in FIG. 3) holds the individual components in an assembly in stacked relationship. Other types of lock rings or discs may be employed as well. When the module has been formed and assembled, it is seated into counter-bore 51, with keys from tension discs 67 and 73 being properly aligned into keyways 52 and 53. When properly seated, lock ring 56 is inserted into lock ring groove 55, to hold the assembled and aligned drag module in proper place. Drag adjustment knob 15 is then threadably mounted onto the threaded tip portion 32 of shaft 21, and sufficient force is provided to establish the degree of friction desired. When in place, the cooperating annular projection 76 and notches 77 hold and maintain the position of drag adjustment knob 15 on line spool mounting shaft 21.

It will be observed that the outer periphery of drag adjustment knob 15 fits within the confines of counter-bore area or zone 83 formed in member 40. Thus, the line spool 46 may be freely removed from the assembly and reomounted without disturbing the setting of the drag mechanism.

With attention directed to FIG. 3, it will be noted that clicker pick 43 is retained in its normal disposition by virtue of its being confined in a cavity formed in the arbor 42. Inwardly directed forces are available from the ribbed ring member which is disposed about the periphery of arbor 42, as shown.

In order to provide for proper friction surfaces at each interface, it is possible and preferable to utilize a washer means between the rear of flange 62 and friction surface 63, this washer means again being fabricated from molded polytetrafluoroethylene. In order to complete the utilization of such a material at each active friction interface, washer or disc 36 is likewise preferably fabricated from molded polytetrafluoroethylene. Thus, each of the active frictional interfaces employed in the formation of the total drag may employ polytetrafluoroethylene along one of the surfaces. It will be appreciated, of course, that each interface need not be so equipped, it being sufficient if a significant number of such interfaces are provided, this providing a summation of frictional components which is no less in its dynamic condition than in its static condition. When such an arrangement is achieved, smooth drag or braking action will be achieved. While molded polytetrafluoroethylene sheet stock is normally available for the washer devices per se, such as washers 70, 72, and 74, as well as the washer disposed between the rear of flange 62 and friction surface 63, it will be appreciated that metallic members having a surface coating of polytetrafluoroethylene may be employed as well.

One significant frictional surface which is not shown in detail is the rear face or flange of the line spooling structure 40. This rear face, which is oppositely disposed from the forward frictional surface 63, is conventional and rests upon and engages the forward surface of washer or disc member 36. This arrangement will be obvious from a review of the drawings.

What is claimed is:

1. In a spinning reel:
   a. a spindle assembly having a central mounting shaft with means for receiving a line spool thereon, said shaft having a shank portion and a threaded tip portion;
   b. line receiving means mounted on said shaft and including a line spool comprising a central sleeve with first and second spaced apart edge flanges and a spool adapter extending generally radially inwardly of and axially between said flanges, a central bore extending through said spool adapter and a counter-bore formed therewithin to provide said spool adapter with forward and rearward generally radially disposed frictional surfaces, and a keyway having radial locking lug means being formed along the periphery of the arbor surface defining said counter-bore and extending axially within said counter-bore;
   c. line winding means adapted to engage line for controlled winding upon said line spool;
   d. arbor abutment means disposed on the shank portion of said mounting shaft and having a generally radially disposed abutment face for frictionally engaging said rearward frictional surface and for determining the axial and controlling the radial disposition of said spool mounting means; and
   e. drag module means for determining the axial forces applied to said frictional surfaces to control the torque required to rotate said spool upon said mounting shaft, said drag module means comprising:
      1. a central core means for non-rotational mounting upon said mounting shaft and within said counter-bore and having a generally symmetrical drive shank with base flange at the rear thereof for frictional engagement with the forwardly disposed frictional surface, said symmetrical shank portion having a non-circular cross-section, the shank portion being arranged to receive a stack of frictional elements of generally annular disc configuration thereon, a base force applying member having its inner surface in contact with the outer exposed surface of the most outwardly disposed frictional element;
      2. a first tension disc in said stack arranged for rotation about the axis of said drive shank and being disposed outwardly of said base flange and having a cooperating lug means lockingly engaged with the lug means formed in said counter-bore to provide for rotation of said tension disc with said spool adapter;
      3. friction washer means in said stack mounted on said symmetrical drive shank and disposed outwardly of said base flange, said friction washer means being arranged for relative rotation about said drive shank and being fabricated from molded polytetrafluoroethylene;
      4. an annular drag washer means in said stack arranged for arcuate rotation with said central core means and having an internal bore with an arcuate segment adapted to engage the non-circular cross-section of said symmetrical drive shank, and being disposed outwardly of said friction washer means and cooperating with said tension disc to clampingly engage said friction washer means therebetween; and
      5. a drag adjustment knob threadedly engaged with the threaded tip portion of said mounting shaft, and adapted to controlably compress the components of said stack against said base flange means.

2. The apparatus as defined in claim 1 being particularly characterized in that said stack of frictional elements includes at least two tension discs and at least two drag washer means, with friction washer means interposed between each tension disc and drag washer interface.

3. The apparatus as defined in claim 1 being particularly characterized in that the symmetrical drive shank of said central core means has a generally hexagonal outer surface configuration.

4. The apparatus as defined in claim 1 being particularly characterized in that the lug means formed along the inner surface of said counter-bore is an axially extending keyway, and said cooperating lug means of said tension disc is a radially extending key.

5. The apparatus as defined in claim 4 being particularly characterized in that said tension disc has diametrically arranged keys thereon, and said counter-bore is provided with a pair of diametrically oppositely disposed keyways.

6. The apparatus as defined in claim 1 being particularly characterized in that locking means are provided for normally retaining said drag module means within said counter-bore.

7. The apparatus as defined in claim 1 being particularly characterized in that the forward most drag washer means is provided with at least one projection along the annular surface thereof, and cooperating notches are formed on the inner surface of said drag adjustment knob for locking engagement therewith.

8. The apparatus as defined in claim 1 being particularly characterized in that said spool adapter comprises a rear flange, with said counter-bore being formed in said spool adapter, and with the outer diameter of said drag adjustment knob being less than the outer diameter of the spool adapter.

9. The apparatus as defined in claim 1 being particularly characterized in that means are provided for audibly indicating relative rotation of said line spool and said mounting shaft.

10. The apparatus as defined in claim 8 being particularly characterized in that the outer periphery of said base flange means is serrated.

11. The apparatus as defined in claim 1 being particularly characterized in that lock ring means are provided to retain said drag module means within said counter-bore.

12. The apparatus as defined in claim 2 being particularly characterized in that each of said tension discs is bowed along its diameter.

13. The apparatus as defined in claim 1 being particularly characterized in that each active frictional surface of said drag means is provided with a surface layer of molded polytetrafluoroethylene at its interface.

* * * * *